United States Patent
Margrave et al.

(10) Patent No.: US 7,941,163 B2
(45) Date of Patent: May 10, 2011

(54) DETERMINING THE LOCATION OF A WIRELESS MOBILE COMMUNICATIONS DEVICE

(75) Inventors: Geoffrey E. Margrave, Naperville, IL (US); Tippure S. Sundresh, Naperville, IL (US)

(73) Assignee: Alcatel-Lucent USA Inc., Murray Hill, NJ (US)

(*) Notice: Subject to any disclaimer, the term of this patent is extended or adjusted under 35 U.S.C. 154(b) by 984 days.

(21) Appl. No.: 11/824,027

(22) Filed: Jun. 29, 2007

(65) Prior Publication Data
US 2009/0005075 A1    Jan. 1, 2009

(51) Int. Cl.
*H04W 24/00*    (2009.01)
(52) U.S. Cl. ............... 455/456.5; 455/456.1; 455/456.2; 455/67.11; 455/226.2

(58) Field of Classification Search ............... 455/456.1, 455/456.2, 456.6, 67.11, 115.1, 115.3, 226.1, 455/226.2
See application file for complete search history.

(56) References Cited

U.S. PATENT DOCUMENTS

| 6,750,818 | B2 * | 6/2004 | Thomas et al. | 342/450 |
| 2008/0133126 | A1 * | 6/2008 | Dupray | 701/204 |

* cited by examiner

*Primary Examiner* — Temica M Beamer
(74) *Attorney, Agent, or Firm* — Carmen Patti Law Group, LLC

(57) ABSTRACT

An exemplary method determines a location of a wireless mobile unit by a node in a communication network. Amplitude adjustment coefficients are received from a rake receiving process used by the mobile unit to receive an incoming signal. A path loss factor is computed based on the amplitude adjustment coefficients. A modified path loss value is calculated based on the path loss factor. The location of the mobile unit is determined based on the modified path loss value.

9 Claims, 4 Drawing Sheets

DETERMINING THE LOCATION OF A WIRELESS MOBILE COMMUNICATIONS DEVICE

BACKGROUND

This invention relates to determining the location of a wireless mobile unit. This invention is especially, but not exclusively, suited for location determination of a cellular mobile unit where information from which its location is determined is available from only a single antenna site.

The location of cellular communication devices for E911 calls must be made available by service providers in the United States and must have a location accuracy as specified by the Federal Communications Commission. For Universal Mobile Telecommunication Systems (UMTS) there are primarily four methods for locating a mobile communication device as defined in the 3GPP standards. One of these methods requires the mobile communication device to have global positioning satellite (GPS) capabilities. It will be appreciated that not all mobile communication devices have such capabilities. Thus, this method is not generally applicable to all mobile units.

Another method for location of a mobile unit is referred to as cell-ID. In its simplest form, the cell with the strongest signal strength for the subject mobile unit is identified and the position of this cell is returned as the mobile unit's position. Because the mobile unit could be anywhere within its coverage region, the method in this basic form is not very accurate. Variations of this method have been implemented to increase the accuracy of the location of the mobile unit as described in FIG. 1.

FIG. 1 illustrates a cellular communication system 10 that includes representative cellular antenna sites 12 and 14. A cellular handset 16 is located within the coverage area of both sites 12 and 14. A radio network controller (RNC) 18 is coupled to antenna sites 12 and 14 by communication lines 20 and 22, respectively. A mobile switching center (MSC) 24 is coupled to the RNC 18 and to a further communication network 26. A location measurement unit (LMU) 28 is coupled to the RNC 18 and is utilized to process information supplied by the infrastructure equipment and/or subject mobile unit in order to make a determination of the location of the mobile unit. Once this determination is made by the LMU 28, the determined location can be, for example, transmitted to an emergency services center that services a corresponding E911 call from the mobile unit.

Antenna site 12 is divided into three sectors 30, 31 and 32 each served by a directional antenna. Similarly, antenna site 14 is divided into sectors 34, 35 and 36. To determine the location of cellular handset 16, the cellular handset is requested to provide two types of measurement data by a standard protocol (RRC). The cellular handset provides a receive-transmit time difference (RxTx) value and a path loss measurement representing the loss in power of signals from the antenna site of the cell to the cellular handset. In this example, these measurements are provided by the cellular handset 16 for both cell sites 12 and 14. The respective RxTx values in combination with the corresponding round trip time (RTT) values from the cells are used to calculate corresponding circles 38 and 40 around the respective center of the cells. The intersection of the circles is used to determine the position of the cellular handset. The information utilized to make the location determination is transmitted to the LMU 28 which calculates the circles 38 and 40, and then determines the point of intersection of the circles which is determined to be the location of the cellular handset. While this technique provides adequate location accuracy, it cannot be used in situations where such location information is available for a mobile unit from only a single cellular site since only a single circle would be defined. Thus, there exists a need for an improved method that can determine the location of a mobile unit with sufficient accuracy, even when location information is available only for a single cellular site.

SUMMARY

It is an object of the present invention to satisfy this need.
An exemplary method of the present invention determines a location of a wireless mobile unit by a node in a communication network. Amplitude adjustment coefficients are received from a rake receiving process used by the mobile unit to receive an incoming signal. A path loss factor is computed based on the amplitude adjustment coefficients. A modified path loss value is calculated based on the path loss factor. The location of the mobile unit is determined based on the modified path loss value. This method enables accurate locations to be determined without requiring GPS information from the mobile unit and with measurement data from only a single antenna site.

A node that implements the above method provides another exemplary embodiment of the present invention.

DESCRIPTION OF THE DRAWINGS

Features of exemplary implementations of the invention will become apparent from the description, the claims, and the accompanying drawings in which:

DETAILED DESCRIPTION

One aspect of the present invention resides in the recognition of the techniques that can be utilized to improve the location accuracy of a wireless communication device even where location information is available for the communication device from only a single cell and without requiring GPS information. Since many practical communication environments have reflective structures in the signal path that give rise to multipath signals at the mobile unit, the reception of multipath signals and the effects of multipath signals on signal strength should be taken under consideration for better location accuracy. As will be explained in more detail below, an embodiment of the present invention effectively compensates for signal strength variations due to the reception of multipath signals which facilitates accurate location determination of a mobile unit.

Figure 1:
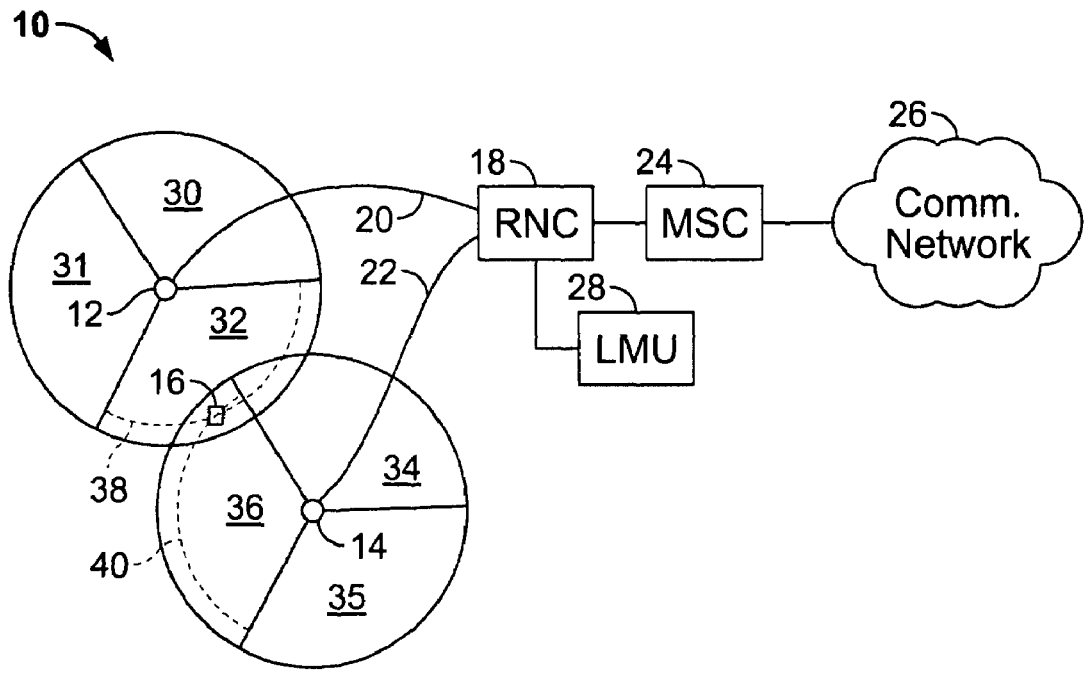
FIG. 1 is a block diagram of a network illustrating a prior art location determination technique.
Figure 2:
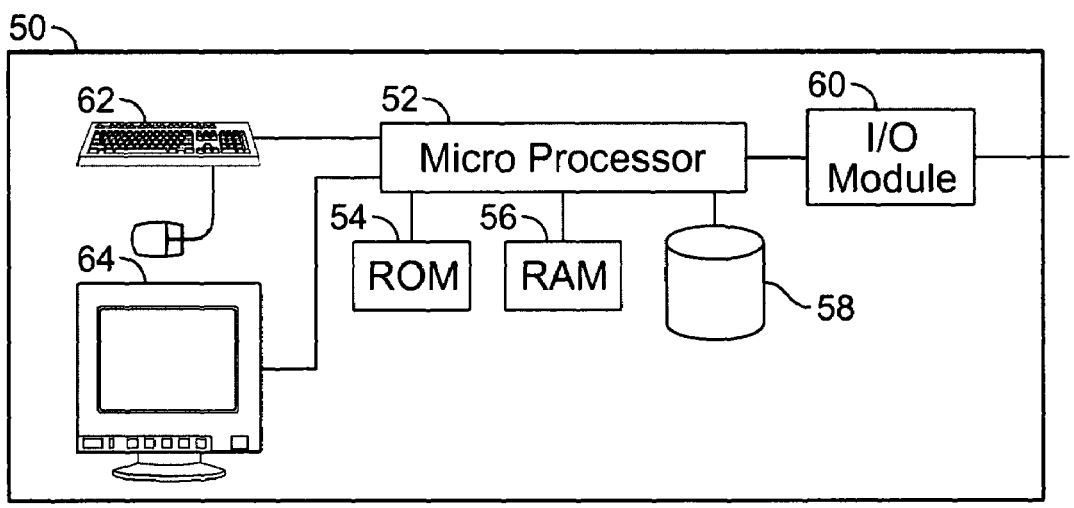
FIG. 2 is a diagram of illustrative communication infrastructure nodes.

FIG. 2 is a block diagram of an infrastructure node 50 such as used in a communication network that supports an embodiment of the present invention. The architecture shown for node 50 could be utilized for an LMU. A microprocessor 52 is supported by read-only memory (ROM) 54, random access memory (RAM) 56, and nonvolatile data storage device 58 which may be a hard drive. An input/output module 60 is coupled to the microprocessor 52 and supports inbound and outbound communications with external devices. Input devices 62 such as a keyboard or mouse permit an administrator to provide data and control inputs to the microprocessor. Output generated by the microprocessor can be displayed to the administrator by an output device 64 such as a monitor. Program instructions initially stored in ROM 54 and storage device 58 are typically transferred into RAM 56 to facilitate run-time operation of the application implemented by microprocessor 52. It will be apparent to those skilled in the art that program instructions can be provided to implement the steps as described in the below exemplary embodiments of methods of the present invention.

Figure 3:
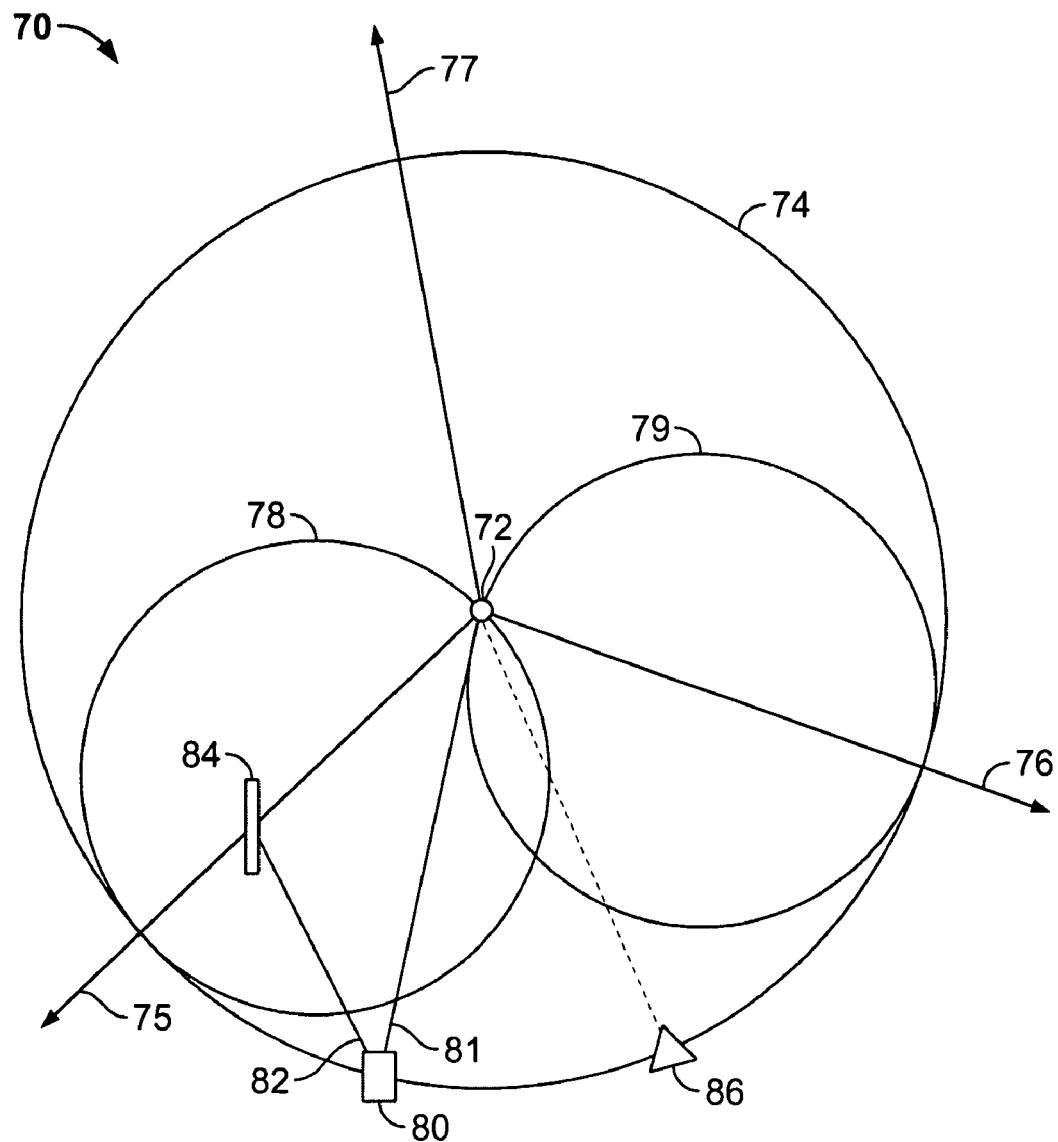
FIG. 3 shows signal patterns for a single antenna site upon which location determination is made.

FIG. 3 shows a single cell site 70 having a common antenna location 72 that defines a cell coverage area. Three sectors are served by three directional antennas pointed in directions 75, 76 and 77, respectively. The antennas associated with directions 75 and 76 have corresponding beam patterns 78 and 79 in which the maximum beam energy is aligned to the respective directions. A cellular handset 80 receives from the antenna associated with direction 75 a direct signal 81 and a multipath signal 82 having been reflected from a signal reflecting structure 84. The cellular handset 80 also receives from the antenna associated with direction 76 a direct signal along the same path as shown for signal 81.

As previously explained, it is known how to compute a circle 74 about the antenna site 72 on which the mobile unit 80 is determined to be located. However, merely relying upon the relative signal strength of signals received by the mobile unit 80 from the two antennas associated with directions 75 and 76 can lead to the location of the mobile unit being erroneously determined to be at location 86. A comparison of the relative received signal strength at the mobile unit of signals associated with the antennas for directions 75 and 76 can lead to this erroneous determination when a multipath signal is present. Of course, the known patterns of the signal strength associated with the beams 78 and 79 are also factored into making the location determination. It has been determined that multipath signal 82 when combined with direct beam signal 81, both originating from the antenna associated with direction 75, can result in a received signal strength by the mobile unit that is substantially less or more than the signal strength that would have been received if the multipath signal 82 were not present. For example, the received signal strength in the presence of the multipath signal may be 6 dB lower than if the multipath signal were not present. Because the received signal strength by the mobile unit of the signals associated with the antennas of directions 75 and 76 are compared to determine the location along the circle 74 between direction 75 and 76, a signal strength lower than expected associated with the antenna giving rise to multipath signal 82 will typically cause the location of mobile unit to be incorrectly determined to be closer to direction 76 than is its actual location 80. This is because a lower signal strength due to the multipath signal received at the mobile unit for the antenna associated with direction 75 would be equivalent to a direct only path signal for mobile unit located a distance counterclockwise from its actual location about circle 74. This is because the magnitude of the beam 78 decreases as one moves counterclockwise from the maximum signal value at direction 75 on circle 74. Therefore, a detected signal strength from the antenna associated with direction 75 that is lower than expected for its actual location along circle 74 will give rise to an erroneous location being determined such as at location 86.

Figure 4:
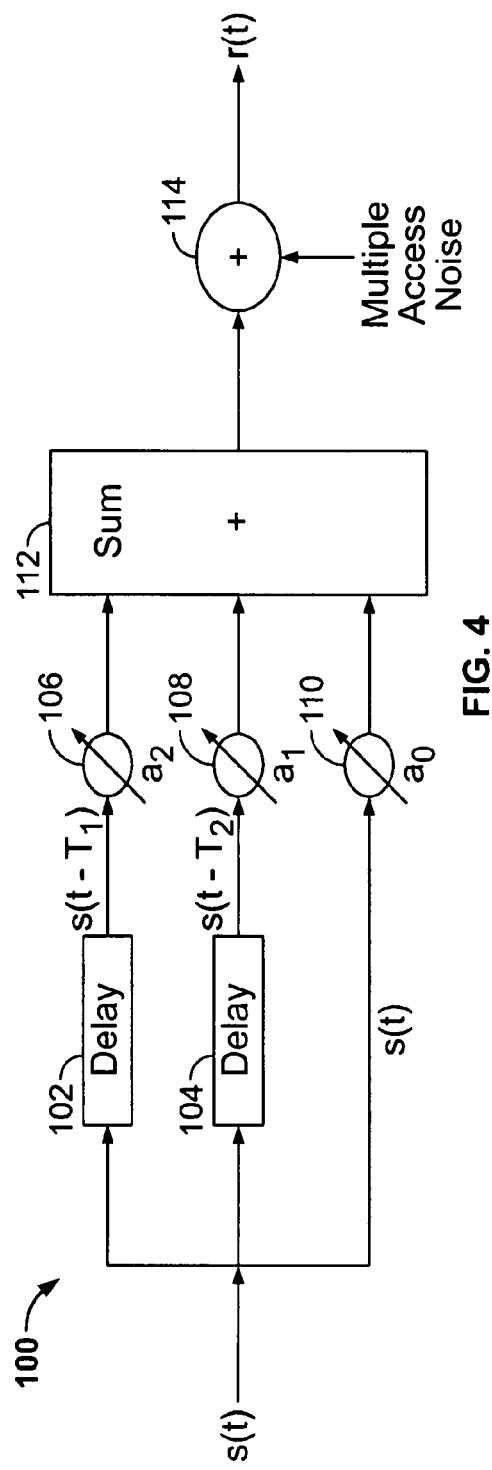
FIG. 4 is a block diagram of a signal propagation model for multipath signals.

FIG. 4 shows a multipath signal propagation model 100. A transmitted signal s(t) is separated by different signal propagation conditions into three signals: one with a delay 102 of T1, another with a different delay 104 of T2, and the signal path with no delay. An amplitude (attenuation) variation 106 is associated with the path involving delay 102, another variation 108 is associated with path involving delay 104, and a further variation 110 is associated with the path having no delay. These three signals, with corresponding time and amplitude variations, are combined at summation node 112. The summed signal from node 112 is further summed at node 114 with unavoidable noise resulting in the actual signal r(t) received at a wireless mobile unit. This propagation model represents a received signal that includes a primary beam signal having no delay, a multipath signal having a delay T1, and another multipath signal having a delay T2.

Figure 5:
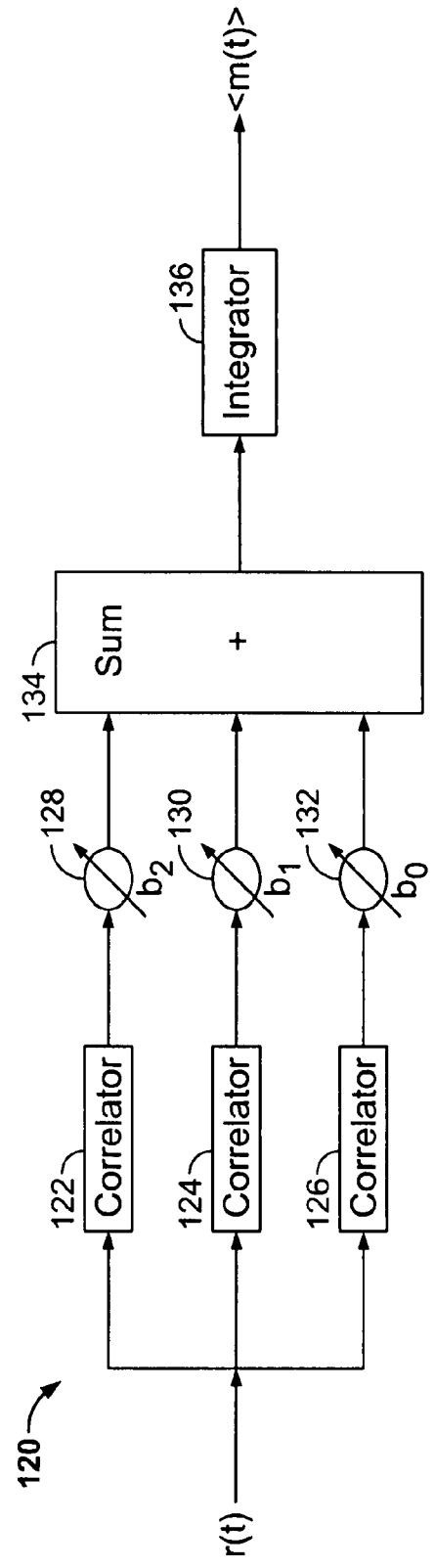
FIG. 5 is a general block diagram of a rake receiver suited for use in a wireless mobile communication device.

FIG. 5 shows an embodiment of a rake receiver 120 as implemented by a wireless mobile unit. The general objective of the rake receiver is to identify and separately process the different signal components of a single transmitted signal so that a combined resulting signal has a minimum of amplitude and phase distortion. A received signal r(t) is processed by three correlators 122, 124 and 126 where each correlator seeks to account for delay associated with the respective signal components. Amplifiers 128, 130 and 132 operate respectively on the signals from correlators 122, 124 and 126, respectively. The amplifiers have corresponding gain settings b2, b1, and b0. The three signals from the amplifiers are summed by node 134. The summed signal from node 134 is processed by integrator 136 to yield a processed signal m(t) in which the adverse effects of up to three different signal components are minimized.

With no strong overall shadowing of the incoming signal, the gain settings b2, b1, and b0 will correspond to the relative strength of the respective signal components. Assuming that the multipath propagation model of FIG. 4 applies to the signal being received by the rake receiver, the gain value associated with the correlator with the maximum delay value, i.e. minimum line-of-sight actual delay, corresponds to the direct signal component. Because the direct, line-of-sight signal ray arrives ahead of the other delayed signal components, it is delayed the most by the correlator in order to achieve time synchronization with the signal components that arrive later in time. For this example, we will assume that the gain setting value, that is associated with the direct ray signal, is b0. The path loss of the direct signal component can be calculated by multiplying the apparent path loss, i.e. the path loss of unprocessed receive signal r(t), by the following factor:

$$b0/(b0+(b1*s1)+(b2*s2))$$

where b(i) identifies corresponding gain settings and s(i) identifies the sign of the signal relative to the main (direct) signal. The factor in decibels is computed by multiplying the log of the factor times 20 for an amplitude decibel factor or times 10 for a power decibel factor. The factor in decibels can be added to the apparent path loss in decibels to achieve a more accurate representation of an expected path loss for the actual location of the wireless mobile unit. As explained above, the measured path loss of a signal with a multipath component will be typically lower than for only a direct ray signal for a given location, and hence adding the factor in decibels to the apparent path loss compensates for the path loss variation due to multipath signal components.

Figure 6:
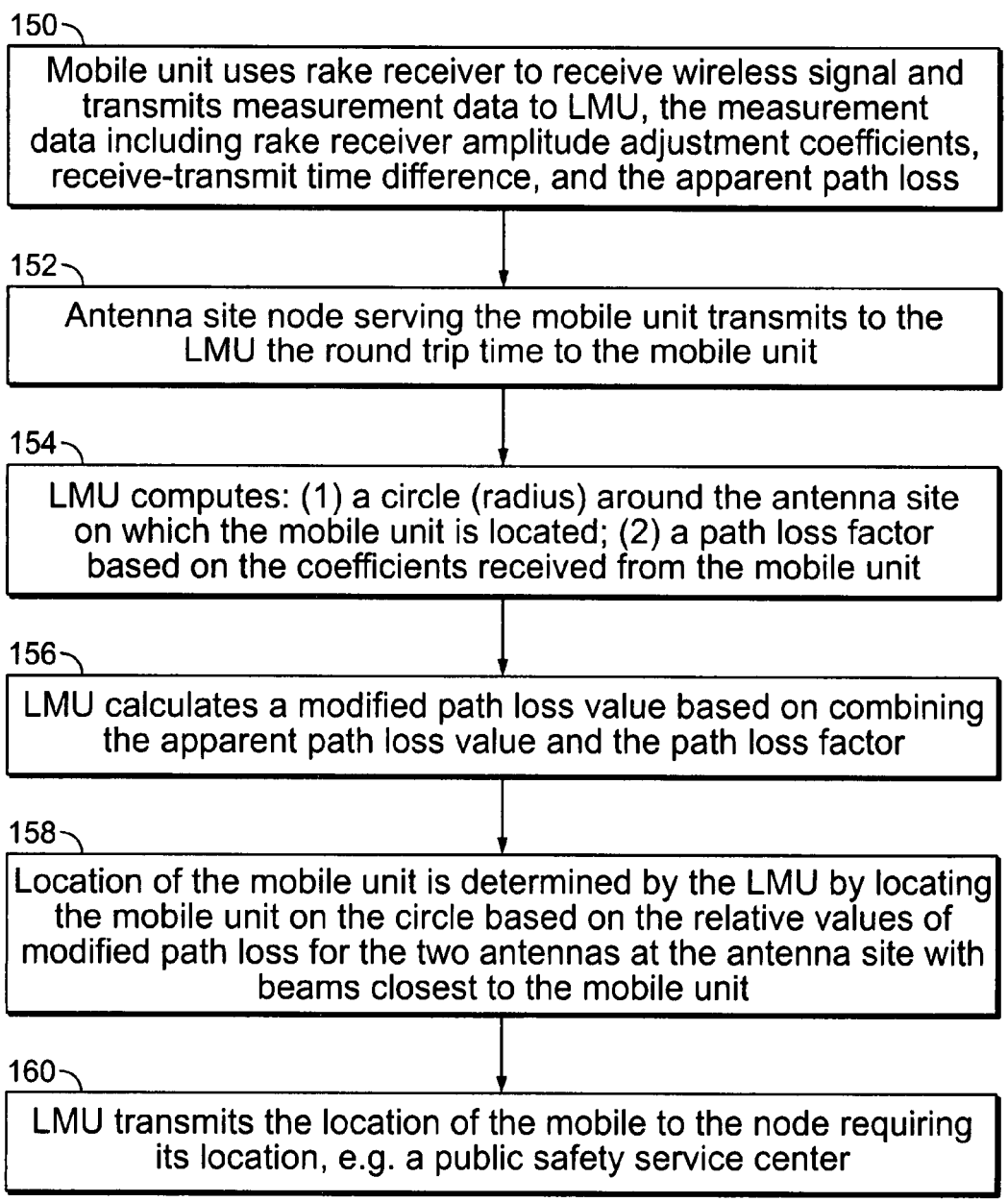
FIG. 6 is a flow diagram of illustrative steps for determining the location of mobile communication device in accordance with an embodiment of a method of the present invention.

FIG. 6 is a flow diagram of steps in accordance with an exemplary method in accordance with the present invention. This method is especially, but not exclusively, suited for use in determining the location of a mobile unit for which relevant measurement data is available from only a single cell site. In step 150 the mobile unit uses its rake receiver to receive an incoming wireless signal and transmits measurement data to a LMU. The measurement data may include the rake receiver adjustment coefficients, the receive-transmit time difference, and the apparent path loss as determined on the uncompensated received r(t) signal. In step 152 the antenna site node serving the mobile unit transmits to the LMU the measured round-trip time to the mobile unit. In step 154 the LMU computes a circle (radius) around the antenna site which serves the subject mobile unit. The circle can be computed based on the receive-transmit time difference value received from the mobile unit and corresponding round-trip time values receive from the node of the relevant antenna site. The LMU also computes a path loss factor, as explained above, based on the coefficients of the rake receiver of the mobile unit. In step 156 the LMU calculates a modified path loss value by combining the apparent path loss value and the path loss factor. For example, the modified path loss value can be determined by adding the path loss factor in decibels to the apparent path loss value also expressed in decibels. In step 158 the location of the mobile unit is determined by the LMU by locating the mobile unit on the circle. The modified path loss for at least one of the two antennas and the path loss of the other antenna are compared with the respective signal strength beam patterns for the respective antennas to determine the location along the circle where the respective path losses correspond to expected signal strengths. A modified path loss value could be computed and utilized for both antennas if significant multipath signal components are present for both. In step 160 the LMU transmits the location determined for the mobile unit to a node requesting its location, e.g. a public safety service center requesting the location of the mobile unit in association with an E911 call. Of course, the location of the mobile unit may be useful and/or required for a variety of other applications or other nodes.

Although exemplary implementations of the invention have been depicted and described in detail herein, it will be apparent to those skilled in the art that various modifications, additions, substitutions, and the like can be made without departing from the spirit of the invention. With regard to the illustrative steps of an embodiment of a method of the present invention, other steps can be substituted, steps deleted, and/or the steps could be practiced in a different order or by a different apparatus. The functions performed by the illustrative LMU could be integrated into and performed by a different node or server. Although the technique described herein is especially useful for determining the location of a mobile unit for which location measurements are available only from a single antenna site and where the mobile unit does not have GPS capabilities, it can be employed in addition to other techniques to enhance location accuracy where the mobile unit has GPS capabilities and/or where the mobile unit is served by two or more antenna sites. A first ray extending from the antenna site, as determined based on a modified path loss value, can be used in combination with location techniques other than the described circle location described in the above exemplary embodiment to determine the location of a mobile unit. For example, a second ray generated by other techniques intersecting with the first ray could be utilized to determine the location of the mobile unit based on the point of intersection of the first and second rays.

The scope of the invention is defined in the following claims.

We claim:

1. A method for determining a location of a wireless mobile unit by a node in a communication network comprising the steps of:
   receiving at the node amplitude adjustment coefficients from a rake receiving process used by the mobile unit to receive an incoming signal;
   computing by the node a path loss factor based on the amplitude adjustment coefficients;
   calculating by the node a modified path loss value based on the path loss factor;
   determining by the node the location of the mobile unit based on the modified path loss value based on measurements of signals between the mobile unit and only one single antenna site.

2. The method of claim 1 further comprising the step of receiving at the node an apparent path loss value from the mobile unit, where the apparent path loss value is a measured path loss of signal strength between the mobile unit and an antenna site based on the incoming signal to the mobile unit.

3. The method of claim 2 wherein the step of calculating a modified path loss value comprises modifying the apparent path loss value based on the path loss factor.

4. A method for determining a location of a wireless mobile unit by a node in a communication network comprising the steps of:
   receiving at the node amplitude adjustment coefficients from a rake receiving process used by the mobile unit to receive an incoming signal;
   computing by the node a path loss factor based on the amplitude adjustment coefficients;
   calculating by the node a modified path loss value based on the path loss factor;
   determining by the node the location of the mobile unit based on the modified path loss value;
   computing the path loss factor comprising identifying a first amplitude adjustment coefficient value corresponding to a direct, not reflected, signal component of the incoming signal, and determining the path loss factor based on a comparison on the first amplitude adjustment coefficient value with a combination of the amplitude adjustment coefficient values corresponding to respective signal components of the incoming signal.

5. The method of claim 4 wherein the step of determining the location of the mobile unit is based on measurements of signals between the mobile unit and only one single antenna site.

6. A node in a communication network that determines a location of a wireless mobile unit comprising:
   a microprocessor processing unit that receives amplitude adjustment coefficients from a rake receiving process used by the mobile unit to receive an incoming signal;
   the microprocessor processing unit computes a path loss factor based on the amplitude adjustment coefficients;
   the microprocessor processing unit calculates a modified path loss value based on the path loss factor;
   the microprocessor processing unit determines the location of the mobile unit based on the modified path loss value based on measurements of signals between the mobile unit and only one single antenna site.

7. The node of claim 6 further comprising the microprocessor processing unit receives an apparent path loss value from the mobile unit, where the apparent path loss value is a measured path loss of signal strength between the mobile unit and an antenna site based on the incoming signal to the mobile unit.

8. The node of claim 7 wherein the microprocessor processing unit calculates the modified path loss value by modifying the apparent path loss value based on the path loss factor.

9. The node of claim 6 wherein the microprocessor processing unit computes the path loss factor by identifying a first amplitude adjustment coefficient value corresponding to a direct, not reflected, signal component of the incoming signal, and determining the path loss factor based on a comparison on the first amplitude adjustment coefficient value with a combination of all of the amplitude adjustment coefficient values corresponding to respective signal components of the incoming signal.

* * * * *